United States Patent [19]

Darling et al.

[11] Patent Number: 4,915,446
[45] Date of Patent: Apr. 10, 1990

[54] INFANT SEAT, REMOVABLE SEAT AND SEAT LATCH

[76] Inventors: Ronald J. Darling, Rte. 5; Thomas G. Darling, Oakridge Estates, Lot 36; Steven M. Darling, 909 Parkview Dr., all of Decatur, Ind. 46733

[21] Appl. No.: 273,664

[22] Filed: Nov. 18, 1988

Related U.S. Application Data

[63] Continuation-in-part of Ser. No. 53,811, May 26, 1987, abandoned.

[51] Int. Cl.⁴ .............................................. A47D 1/10
[52] U.S. Cl. ..................................... 297/250; 297/329
[58] Field of Search ................ 297/250, 216, 254, 329

[56] References Cited

U.S. PATENT DOCUMENTS

| | | |
|---|---|---|
| 3,290,050 | 12/1966 | Ezquerra .......................... 297/130 X |
| 3,649,074 | 3/1972 | McDonald et al. ................ 297/130 |
| 3,934,934 | 1/1976 | Farrell Jr. et al. ................. 297/250 |
| 4,251,612 | 11/1980 | Meeker .............................. 297/250 |
| 4,345,791 | 8/1982 | Bryans et al. ..................... 297/250 |
| 4,501,032 | 2/1985 | Heath et al. ...................... 297/216 |
| 4,545,613 | 10/1985 | Martel et al. ..................... 297/250 |
| 4,634,177 | 1/1987 | Meeker .............................. 297/250 |

*Primary Examiner*—Zugel Francis K.

[57] ABSTRACT

An infant seat, a removable seat and a seat latch, the seat having a base, a removable seat, and means for restraining a child in the removable seat. The seat is usable as a car seat and the base securable to an automobile seat with a seat belt. The removable seat is joined to the base and reversibly disjoinable from the base without removal of the child from the seat.

26 Claims, 5 Drawing Sheets

100
INFANT SEAT, REMOVABLE SEAT AND SEAT LATCH

This is a continuation-in-part of co-pending application Ser. No. 053,811 filed on 5-26-87, abandoned.

BACKGROUND OF THE INVENTION

This invention primarily relates to infant seats, removable seats and latches therefore, and more particularly to an infant seat, a seat latch, and an a removable seat which may be removed and used separately therefrom. However, the seat of the invention is not limited to an infant seat for use within a car or other vehicle by a child. The invention may be sized to fit an adult and may have a base inappropriate for vehicular use; such as for example, a wheeled base usable as a stroller or a fixed upright base usable as a chair.

Car seats are widely used for the transportation of children within vehicles. With previous car seats either the child or the car seat or both must be secured with a seatbelt or the car seat's restraining system, just prior to use.

It is difficult to secure or unsecure a car seat containing a child with a seat belt. It is also difficult to restrain or unrestrain a child in a previously secured car seat particularly if the child is uncooperative. Both are made more difficult by limited access; such as in the back seat of a two door automobile, by inclement weather, and by other conditions, such as, for example, a sleeping child. Because of the difficulty of securing a child containing car seat, such car seats are not readily usable for transporting a child portal to portal. It is also difficult to change the orientation of previous car seats. Previous car seats do not allow for the seat to recline, face both forward and rearward, or otherwise be selectively positioned during use. Previous car seats also do not provide for a car seat latch which allows the seat to be removed and used on a variety of bases.

It is therefore highly desirable to provide an improved seat, and an improved seat latch.

It is also highly desirable to provide an improved seat, and an improved seat latch in which a separable base and seat are latched together.

It is also highly desirable to provide an improved seat, and an improved seat latch, which provide for easy assembly and disassembly of the seat and base with or without a child present in the car seat.

It is also highly desirable to provide an improved seat and an improved car seat latch which provide for separable seat and base portions.

It is also highly desirable to provide an improved seat and an improved seat latch which provide for easy alignment of the two separable portions of the seat.

It is also highly desirable to provide an improved seat and an improved seat latch which are safe and convenient to use.

It is also highly desirable to provide an improved car seat and an improved car seat latch which provides all of the above desired features.

SUMMARY OF THE INVENTION

It is therefore an object of this invention to provide an improved seat, and an improved seat latch.

It is another object of this invention to provide an improved car seat and an improved car seat latch.

It is also and object of the invention to provide an improved car seat and an improved car seat latch in which two separable portions are latched together.

It is also an object of the invention to provide an improved seat and an improved seat latch, which provides for easy assembly and disassembly of two portions of the seat with or without a child present in the seat.

It is also an object of the invention to provide an improved seat and an improved seat latch which provide for two separable portions which can be disjoined by a person gripping a pair of handles of the car seat.

It is also an object of the invention to provide an improved seat and an improved seat latch which provide for easy alignment of two separable portions of a car seat.

It is also an object of the invention to provide an improved seat and an improved seat latch in which two separable portions of a car seat are not partially disjoined by a displacement of the latch release mechanism over less than a selected distance.

It is also an object of the invention to provide an improved seat and an improved seat latch which provide all of the above desired features.

In the broader aspects of this invention there is provided an infant seat, a removable seat and a seat latch, the seat having a base, a removable seat and means for restraining a child in the removable seat. The seat is usable as a car seat and the base securable to an automobile seat with a seat belt. The removable seat is joined to the base and reversibly disjoinable from the base without removal of the child from the seat.

BRIEF DESCRIPTION OF THE DRAWINGS

The above mentioned and other features and objects of this invention and the manner of attaining them will become more apparent and the invention itself will be better understood by reference to the following description of an embodiment of the invention taken in conjunction with the accompanying drawings, wherein.

DESCRIPTION OF A SPECIFIC EMBODIMENT

Figure 1:
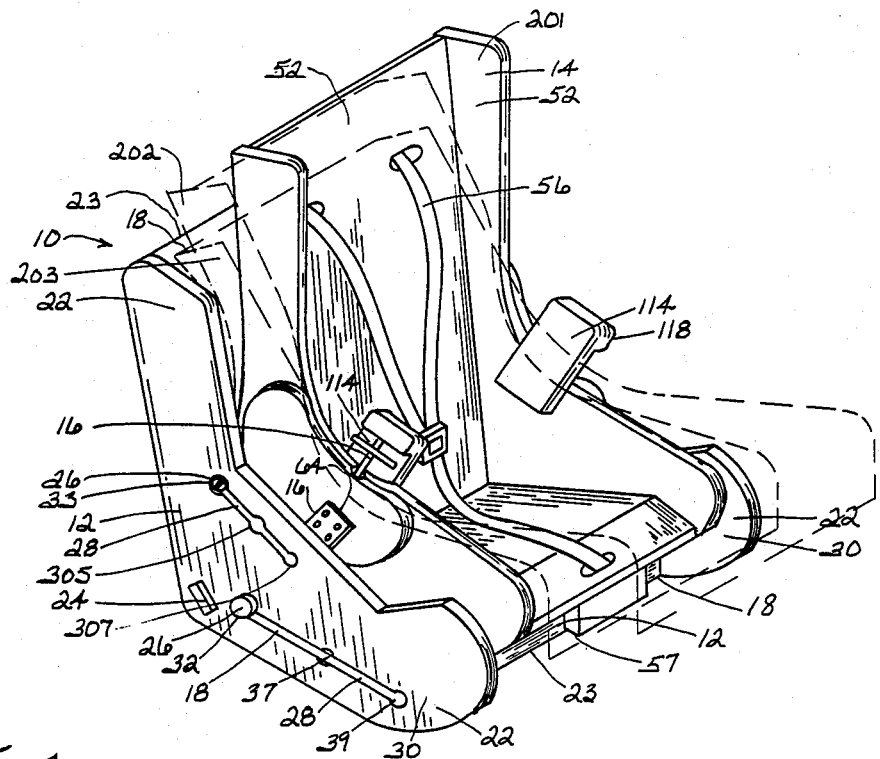
FIG. 1 is a perspective view of the improved seat of the invention showing three orientations of the removable seat, within the base, one in solid lines and the other two in dashed lines. Representations of upper and lower fasteners are deleted for the orientations shown in dashed lines.

The seat 10 of the invention has a base member 12 and a removable seat or insert 14 joined together by one or insert or infant carrier more latches 16. Seat 14 ma occupy six different orientations on base member 12, three with a forward placement and three with a reversed placement of seat 14. Four of these orientations are illustrated: in FIGS. 1 and 2. :in FIG. 1, a forward upright orientation 201, a forward normal orientation 202, and a forward reclining orientation 203 for a seated older child; in FIG. 2, a a forward normal orientation 202, a forward upright orientation 201, and a reversed normal orientation 204. A reversed upright orientation and a reversed reclining orientation are not illustrated. Other additional orientations may be provided for as desired. The term infant carrier is used herein not to refer to any prior infant carriers but to refer to an insert which holds the infant and may function as a seat, a cradle, chaif, or any other device in which an awake or sleeping infant may be placed.

Figure 2:
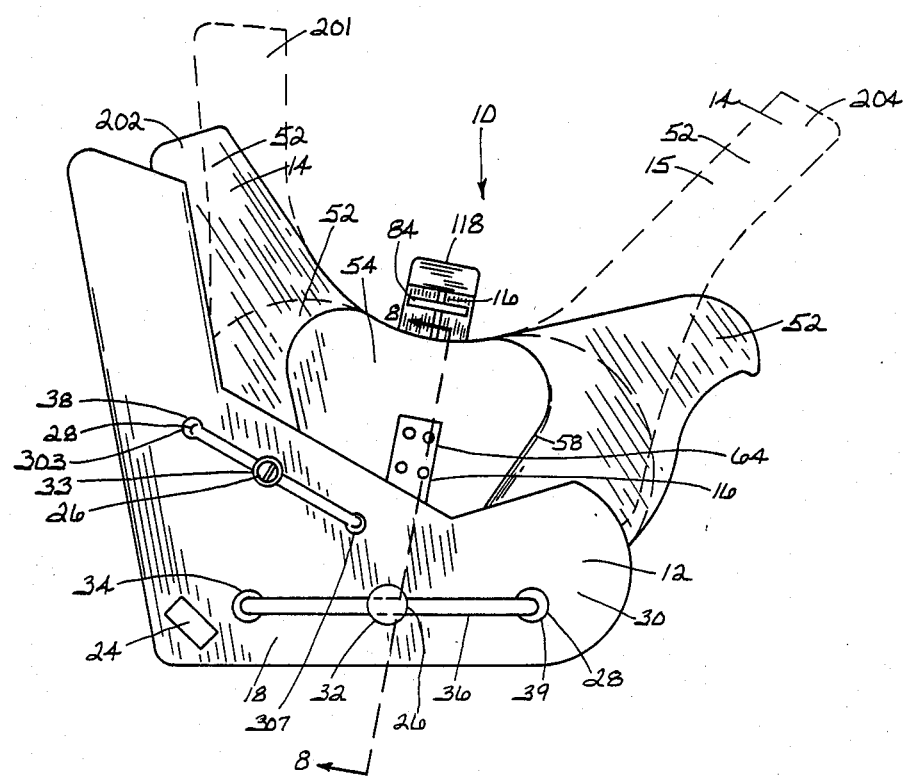
FIG. 2 is a side plan view of the improved seat of the invention illustrated in FIG. 1 showing the insert in reverse position and three orientations of the removable seat within the base. One orientation is shown in solid lines, and the other two orientations are shown in dashed lines as in FIG. 1. Representations of upper and lower fasteners are deleted for the orientations shown in dashed lines.
Figure 3:
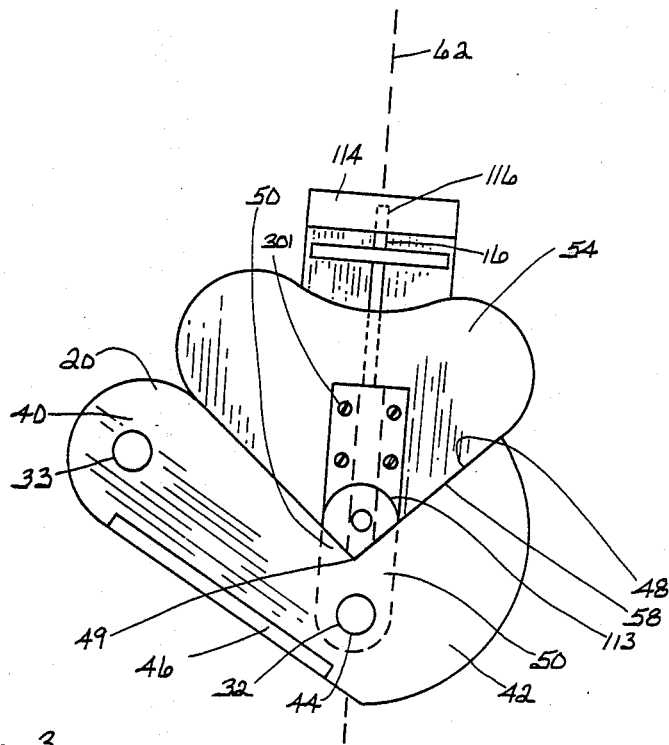
FIG. 3 is a fragmentary side plan view of the seat illustrated in FIGS. 1 and 2 the frame of the base and the main portion of the removable seat deleted.
Figure 4:
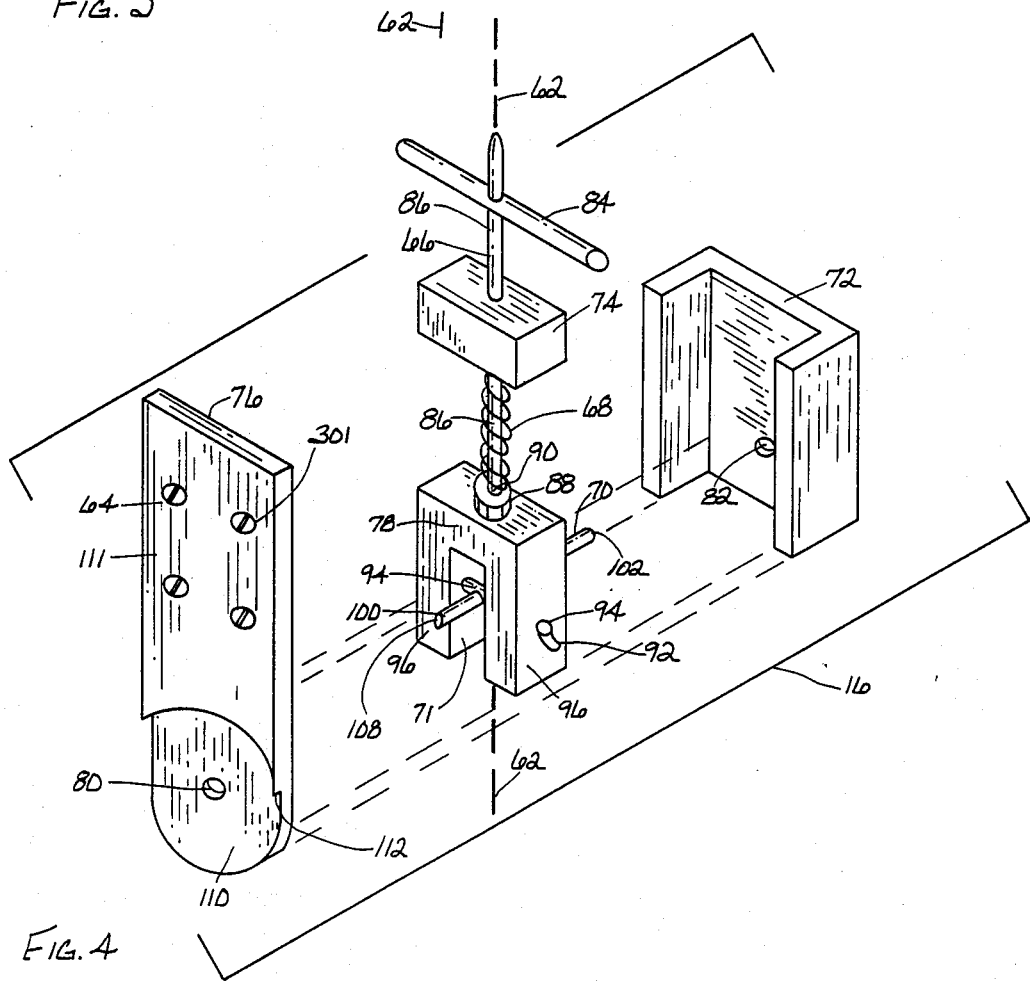
FIG. 4 is an exploded view of the latch of the invention illustrated in FIGS. 1, 2 and 3.
Figure 5:
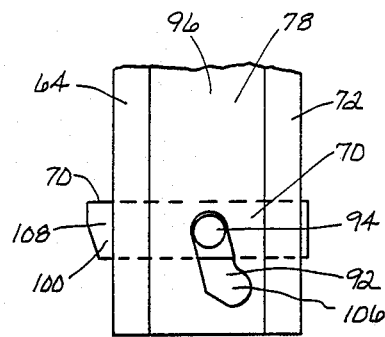
FIG. 5 is a partial cross sectional view of the latch of the invention illustrated in FIG. 4 showing the cross bolt in an extended position.
Figure 6:
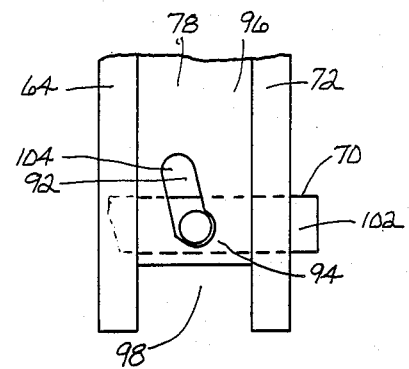
FIG. 6 is a partial cross-sectional view of the latch illustrated in FIG. 5 showing the cross bolt in a retracted position.
Figure 7:
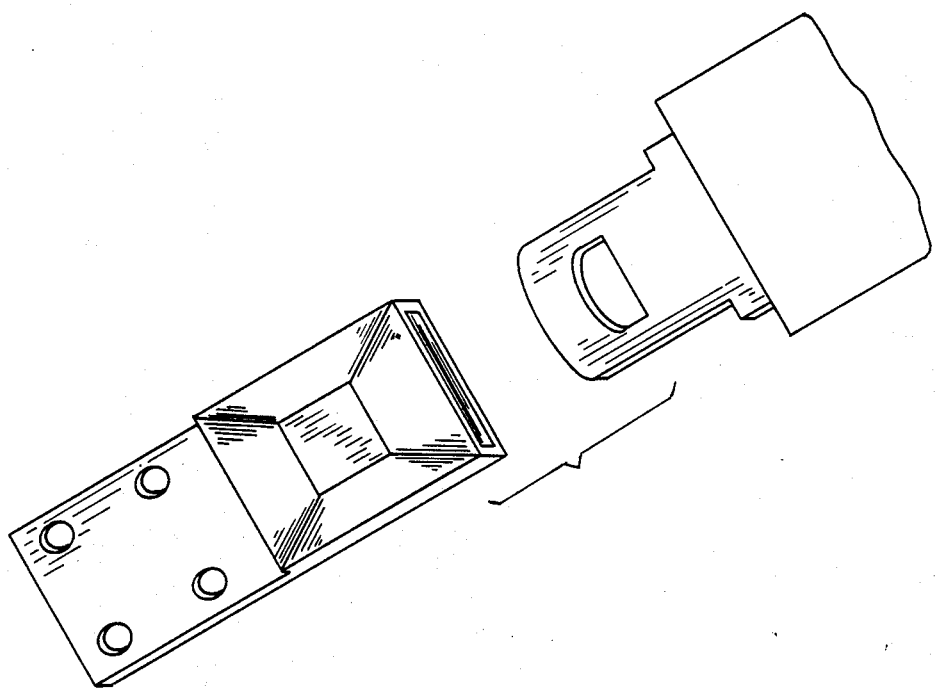
FIG. 7 is a fragmentary view showing a second buckle arrangement for the invention.
Figure 8:
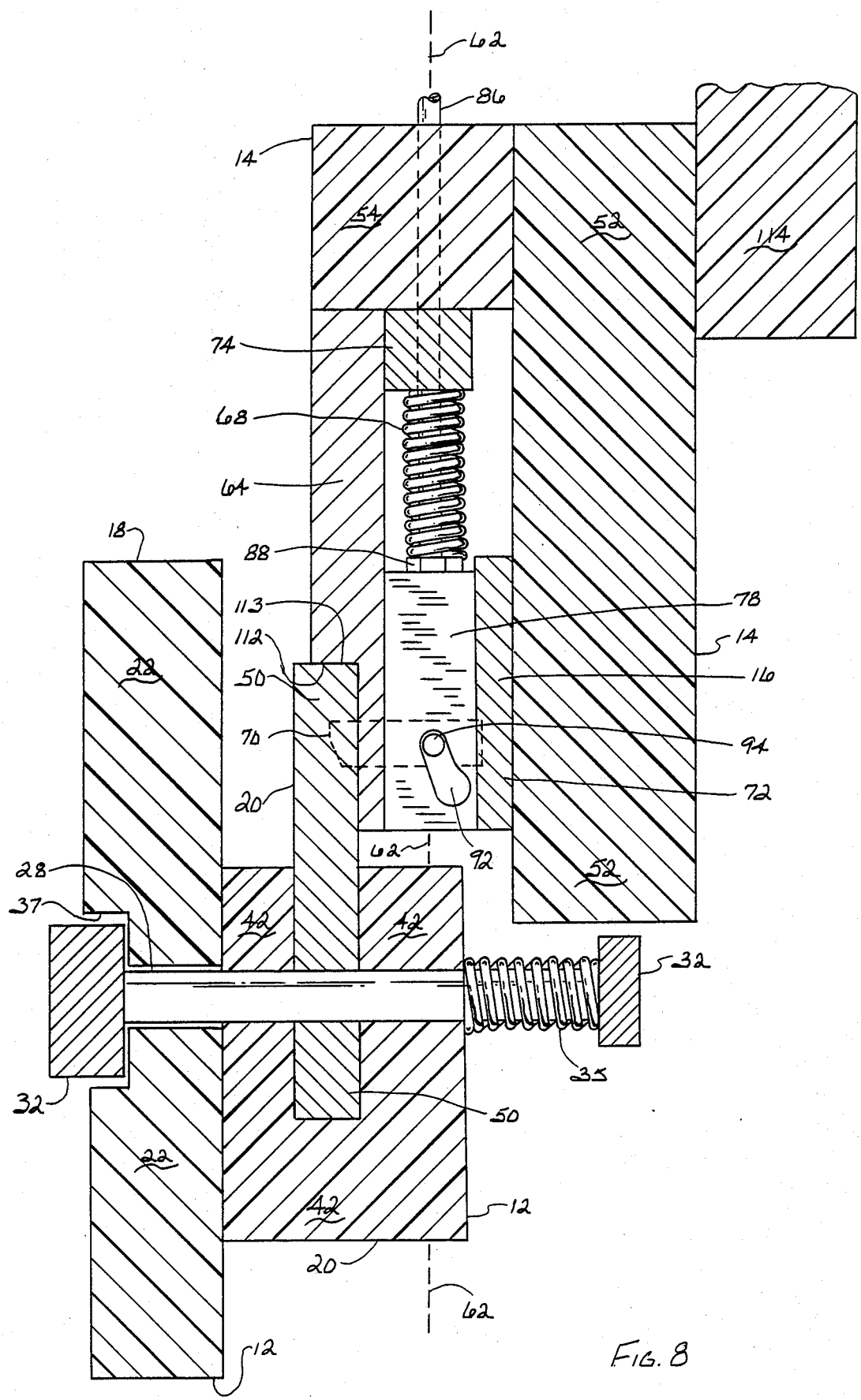
FIG. 8 is a partial cross-sectional view of the seat of FIG. 1, taken along section line 8—8 in FIG. 2, illustrating the removable seat of the invention latched to the base. The positions of cross-bolt 70 and shaft portion 86 of latch 16 are indicated by dashed lines. Some dimensions are exaggerated for clarity.
Figure 9:
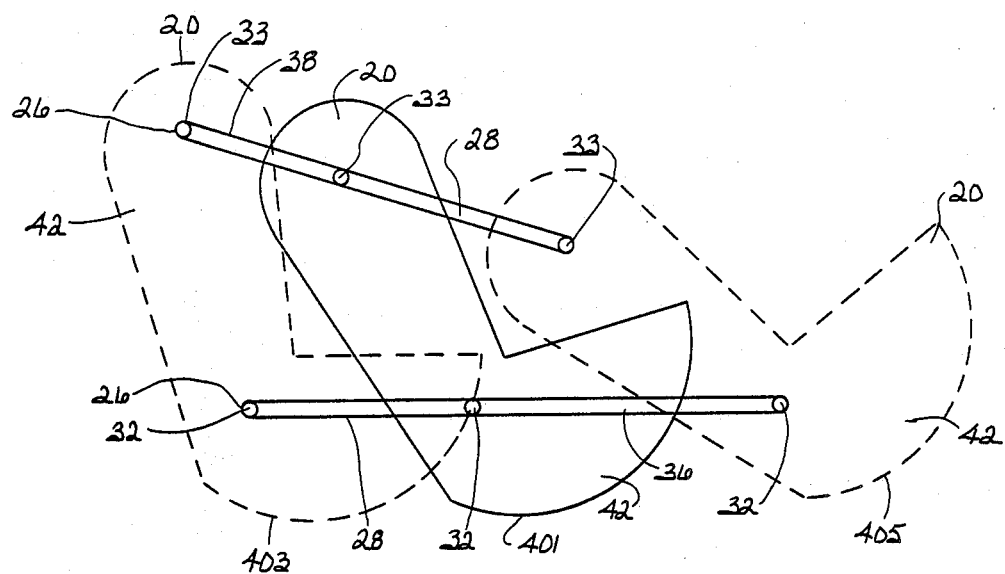
FIG. 9 is a diagrammatical view which superimposes the holder of the base shown in FIGS. 1, 2 and 3 and the slots in the frame of the base. The holder and the connectors which extend from the holder through the slots in the base are illustrated by solid and dashed lines in three positions: a normal position shown in solid lines, an upright position shown in dashed lines and reclining position shown in dashed lines.

Base member 12 has a frame 18 and a holder 20. Frame 18 is illustrated in FIGS. 1 and 2 as composed of oppositely disposed panels 22 joined by cross-members 23. However, in other embodiments, base 12 could take a variety of forms such as for example, a tubular base of bent metal tubing or a complexly curved molded shell of high strength plastic. Base member 12 includes slots 24 for securing base 12 to an automobile seat with a seatbelt.

Holder 20, in the specific emodiment of the invention illustrated, has a pair of side members 42 joined by a cross member 46. Holder 20 is sized and shaped to be movable within frame 18 between positions, as desired. Holder 20 is movable between two or more positions on frame 18 to provide for different orientations of insert or carrier 14. In embodiments of the invention in which base member 12 is not designed to be retained by a seat belt, such as, for example, a wheeled base 12 for providing the mobility of a stroller or a fixed base 12 for providing the functions of a chair, holder 20 may be movable or permanently affixed in a single position on frame 18.

Movement of holder 20 on frame 18 may be provided in a variety of ways. In one embodiment, holder 20 may be disposed within frame 18 and connectors 26 may extend from holder 20 through slots 28 in sides 30 of frame 18 to provide for movement of holder 20 between positions.

Connectors 26 may, for example, consist of a pair of upper connectors 33 and a pair of lower connectors 32 as illustrated. The upper connectors 33 may be bolts and knobbed nuts or other similar fasteners which can be loosened temporarily during repositioning of holder 20. Lower connectors 32 may be a pair of knobbed rods 32, resiliently biased against withdrawal in a direction away from holder 20 by springs 35 and matched to stops 34, 37, 39 in frame 18 adjoining slots 28. Spring biasing on lower connectors 32 may be provided as required to prevent manipulation of lower connectors 32 by a child. Each pair of stops 34, 37, 39 represents a selected position: upright position 403, normal position 401 and reclining position 405, respectively, for holder 20 within frame 18. Each position 401, 402, 403 permits forward and reverse orientations of insert 14. For example, in both forward normal orientation 202 and reversed normal orientation 204, holder 20 is in normal position 401.

Two slots 28 are provided in frame 18. Lower slot 36 extends roughly longitudinally in side 30 of frame 18. Upper slot 38 is at an angle to and displaced rearwardly back from lower slot 36. Slots 36, 38 have enlarged portions or stops 34, 37, 39 and 303, 305, 307, respectively, at opposite ends and in the middle to receive connectors 32, 33 respectively.

Upper connectors 33 are at the rear end 40 of a side member 42 of holder 20 and lower connectors 32 are at the center 44 of side member 42.

In other specific embodiments, the seat 10 of the invention may have only two positions, a forward normal orientation 202 and a reverse normal orientation 204. This is accomplished by merely fixing holder 20 to the base member 12 by fixing fasteners 32 and 33 in holder normal position 401. With the holder 20 thus immovably secured to base member 12, seat 14 can be inserted into holder 20 in either forward, normal orientation 202 or reverse normal orientation 204. Alternatively, only four orientations of seat 14 within base member 12 can be provided by merely eliminating one of the stops 34 or 39 thereby allowing lower connector 32 only to move between stops 37 and 39 or 32 and 37. Finally, in another specific embodiment, main plate shoulder 112 and a strike plate shoulder 113 may be shaped assymetrically such that seat 14 could not be latched in both a forward and a reversed position. With the shoulder 112 and 113 assymmetrical in a manner above-described, seat 10 of the invention as illustrated in the drawings would only have three positions either a forward upright orientation 201, a forward normal orientation 202 and a forward reclining orientation 203 or a reverse upright orientation, a reverse reclining orientation and a reverse normal orientation 204. These orientations could be further limited to only two orientations by eliminating one or the stops 34 or 39 as above-described.

Side members 42 of holder 20 each have a holder flange 48 which has a roughly upward directed concave shape, and in one embodiment is "v"-shaped. In a specific embodiment, the point 49 of flange 48 is at the center 44 of side member 42. Holder 20 includes strike plates 50 which engage latches 16. Strike plates 50 are at centers 44 mounted inside side members 42 and extend up from holder flanges 48. Strike plates 50 are preferably made of a strong rapid material such as steel and are large enough for lower connectors 32 to be mounted to strike plates 50.

Seat or carrier 14 has a main portion 52 and a pair of side portions 54. Main portion 52 is configured as appropriate for a particular use. For example, main portion 52 of seat or carrier 14 may be made larger or smaller without changing the size of base member 12 for use as a car seat for larger or smaller children. The size of side portions 54 would be changed.

Main portion 52 may include a harness 56 for restraining a child placed within seat or carrier 14. A simplified harness 56 is illustrated in FIG. 1, however, the car seat 10 of the invention is not limited to any particular kind of harness 56 or other restraining means. In a specific embodiment, harness 56 is connected to seat 14 and not to base member 12.

Side portions 54 mate with holder 20. In other specific embodiments, harness 56 is connected to a retracter and inertial restraint 57 as shown in FIG. 1. The retracter and inertial restraint 57 maintains harness 56 taut against the child and upon impact against the restraint holds the restraint in position and the child in the seat. Side portions 54 each have a flange 58, which has a downward pointed roughly convex shape, complementary in shape to a respective holder flange 48. In a specific embodiment of the invention, the lower edge 60 of seat or carrier 14 is curved so as to permit seat 14, when removed from base member 12 to be used as a rocker. In that embodiment it is convenient to shape side portions 54 so as to balance seat or carrier 14 for easy rocking.

Latch or latches 16 are connected to seat or carrier 14, by fasteners 301 or adhesive or the like. In a specific embodiment, latch 16 is connected to each side portion 54 of seat 14 and axis 62 of latch 16 extends through center 44 of side member 42 and through lower connector 32 of holder 20. Each latch 16 has a main plate 64, an actuator 66, a spring 68, a cross bolt 70, a cover member 72 and a stop block 74.

Cover member 72 and stop block 74 are rigidly mounted to the inside surface 76 of main plate 64. A carrier portion or cam portion 78 of actuator 66 is disposed between main plate 64 and cover member 72. A retractable and extendable cross bolt 70 is carried by carrier portion 78 in gap 71. Cross bolt 70 lies in holes 80, 82 of main plate 64 and cover member 72 respectively. Retraction of cross bolt 70 is provided by a pull on handle portion 84 of actuator 66 in a direction out from seat 14 along axis 62. Actuator 66 is connected to carrier portion 78 by shaft portion 86. Adjustment of the position of handle portion 84 on shaft portion 86 may be provided, for example by reciprocally threaded portions.

Retraction of cross bolt 70 is opposed by a compression spring 68 concentric with shaft portion 86 and bearing on stop block 74 or some other resilient means. If desired, a nut 88 movable on a threaded section 90 of shaft portion 86 can provide for adjustment of spring 68.

Movement of cross bolt 70 in a direction transverse to axis 62 can be provided by a number of means such as gears or lever arms, but is shown provided by the action of cam slots 92 in legs 96 of carrier portion 78 on ears or cam followers 94 of cross bolt 70. In this embodiment of the invention, main plate 64 and cover member 72 define a channel 98 within which carrier portion 78 can freely slide. In a specific embodiment, channel 98 has a shape, such as rectangular, which will prevent rotational movement of actuator 66 about axis 62. This maintains an engagement arm 100 and a guide arm 102 of cross bolt 70 in appropriate positions in holes 80,82 respectively and helps prevent arms 100, 102 from jamming in holes 80,82.

Slots 92 in carrier portion 78 are eccentric and are sized to grip ears 94 of cross bolt 70, but are loose enough to permit motion of ears 94 along slots 92. Since arms 100,102 are constrained by holes 80,82, motion of ears 94 along slots 92 results in motion of cross bolt 70 rectilinear to axis 62. Slots 92 could be ovals disposed diagonally to legs 96 of carrier portion 78, however, it is shown that slots 92 have a generally two lobed shape with an upper lobe 104 having its longest dimension roughly parallel to axis 62 and a lower lobe 106 having is longest dimension roughly perpendicular to axis 62. This insures that a desired amount of compression of spring 68 will have to occur before engagement arm 100 starts to withdraw from holder 20 and that once engagement arm 100 starts to withdraw it will travel rapidly, decreasing the possibility of engagement arm 100 binding or withdrawing incompletely. This can be utilized to prevent a child from being able to move actuator 66 a sufficient distance to disturb cross bolt 70.

Spring 68 keeps engagement arm 100 of cross bolt 70 in a normally extended state. Engagement arm 100 is sufficiently long and spring 68 is sufficiently incompressible so as to prevent engagement arm 100 and base member 12 from disengaging except upon deliberate actuation of latch 16. The outer end 108 of engagement arm 100 may be notched underneath so as to permit cross bolt 70 to retract when pressed by base member 12 upon emplacement of insert 14 within base member 12. In a specific embodiment, the retraction of outer end 108 results from cross member 70 bearing on a rigid hard structure such as a strike plate 50.

In a specific embodiment of the invention, the outside surface 111 of main plate 64 has a recessed face 110 bordered by a shoulder 112, which is complementary in shape to and engages a strike plate shoulder 113 of a strike plate 50 when seat or carrier 14 is joined to holder 20. In this specific embodiment of the invention, shoulder 112 is concave in shape. To permit ease in carrying, seat or carrier 14 may include handles 114 which each extend out from a side portion 54 of seat or carrier 14. In this embodiment of the invention, handles 114 adjoin handle portions 84 of actuator 66 and may include a guide 116 for shaft portion 86 of actuator 66. Handle portions 114 are configured so as to be grasped by a user, who at the same time is able to grasp and pull outward from base member 12 handle portions 84. If desired, handle portions 84 may be spaced sufficiently distant from an outer end 118 of handles 114 so as to permit handles 114 to be grasped without contacting handle portions 84 to allow easier carrying of seat 14 when separated from base member 12.

In operation, the seat 10 of the invention may be utilized by first placing base member 12 in a vehicle seat and securing base member 12 with a seat or carrier belt. While seat 14 may be present in base member 12 while base member 12 is secured, it is more convenient to have seat or carrier 14 and base member 12 separated. For example, base member 12 can be left installed in a vehicle and a child can be restrained in seat or carrier 14 and removed from seat 14 only within buildings, if desired. The seat or carrier 14, holding the child, can be easily joined to base member 12 by aligning base member 12 and seat or carrier 14 and actuating latches 16.

In a specific embodiment of the invention, handles 114 on each side of insert or carrier 14 make it easy to hold seat or carrier 14 and child and operate latches 16 at the same time. Also, in this specific embodiment of the invention, insert and holder flanges 58,48 allow insert or carrier 14 to slip on holder 20 into an appropriate location for latching strike plates 50 to press engagement arms 100 of cross bolts 70 during installation of seat or carrier 14, to provide in effect automatic alignment and automatic latching of seat or carrier 14 to base member 12. The orientation of seat or carrier 14 on base member 12 may be changed by varying the position of holder 20 on frame 18 either before or after seat 14 is installed and sliding seat or carrier 14 to its desired orientation. In a specific embodiment of the invention, upper connectors 33 are loosened to allow sliding and lower connectors 32 can then be pulled outward lower connector springs 35 to move seat 14 in through holder 20. Holder 20 is then slid on frame 18 and connectors 32 are returned to their original condition.

In a specific embodiment, the latch 16 may take the form of conventional automobile seat belt buckles 120 and tangs 122. Both buckels 120 and tangs 122 have holes 124 therein such that they may be attached to main plates 64 and seat side portions 54, respectively, by bolts, screws, rivets or other suitable fasteners. Perferably, buckles 120 are secured to seat side portions 54 with actuators 64 within reach when grasping handles 114 so that the operational functionality above-described remains the same.

While a specific embodiment of the invention has been shown and described herein for purposes of the illustration the protection afforded by a patent which may issue upon this application is not limited strictly to the disclosed embodiment, but extends to all structures and arrangements which contain the essence of the invention, and which fall fairly within the scope of the claims, which are appended hereto:

Seat 10 of the invention provides an improved seat and an improved seat latch which can be used as a car seat and a car seat latch wherein two separable portions are latched together. The two separate portions are easily assembled and disassembled with or without a child in the seat by a person gripping a pair of handles on the car seat and disengaging the latch. Insertion of the seat into base member 12 is also easily accomplished by the shoulders of flanges 48, 58 and the strike plate and main plate shoulders 112, 113.

What is claimed is:

1. A seat for use by a child in an automobile equipped with a seat belt, said seat comprising a base member securable within an automobile by said seat belt, said base member having a frame and a holder, said holder being disposable within said frame in at least two positions, said holder being selectively slideable between said positions, an infant carrier joined to said holder, said carrier being disjoinable from said holder without removal of the child from said carrier, and means for restraining the child in said seat.

2. The seat of claim 1 wherein said carrier is joinable in rigid relationship to said holder in a forward placement and a reversed placement.

3. The seat of claim 1 wherein said carrier is removably latched to said holder and wherein said holder is slideable between said positions with said carrier latched to said holder and with said carrier disjoined from said holder.

4. The seat of claim 1 wherein said carrier during rejoining of said carrier and said holder is slideable on said holder into one selected placement of a pair of stable placements on said holder.

5. A seat comprising a frame, a holder mounted in said frame, said holder being moveable between a plurality of positions within said frame, means for releasably retaining said holder in said positions, said means for releasably retaining being biased against release of said holder, means for retaining said holder in said frame in a plurality of positions, an infant carrier, and one or more latches connected to said carrier, said insert being joinable in rigid relationship to said holder by said latches, said carrier being reversibly disjoinable from said holder by actuation of said latches.

6. The seat of claim 5 wherein said carrier is connectable to said holder only by said latches.

7. The seat of claim 5 wherein said carrier is joinable to said holder in two placements.

8. The seat of claim 7 wherein said frame has a first pair and a second pair of opposed slots, said first pair of slots being at least roughly longitudinal, said second pair of slots being disposed at an angle to said first pair of slots, and wherein said holder has two or more pair of connectors, said connectors being slidable in said slots, to reposition said holder on said frame.

9. The seat of claim 5 wherein said carrier has one or more seat flanges, said seat flanges each being centered on a respective one of said latches, and wherein said holder has one or more holder flanges complimentary in shape to said seat flanges, said seat flanges being slidable on said holder flanges to direct placement of said carrier on said holder.

10. The seat of claim 9 wherein said latches are actuable by said holder during assembly of said carrier on said holder and wherein said flanges prevent stable placement of said insert on said holder, absent engagement by said latches of said holder.

11. The seat of claim 9 wherein said carrier is capable of rocking upon disjoining of said carrier from said holder.

12. The seat of claim 5 wherein 5 wherein said latches each have a generally concave dowward facing latch shoulder, and wherein said holder further comprises one or more strike plates being equal in number to said latches, said strike plates being retractably engaged by said latches, upon joining of said insert to said holder, said strike plates each having an upward facing strike plate shoulder complimentary in shape to a respective one of said latch shoulders said strike plate shoulders each engaging a respective one of said latch shoulders, upon joining of said carrier to said holder.

13. The seat of claim 5 wherein said carrier further comprises one or more handles disposed adjacent said latches and wherein said latches are actuable by an individual grasping said handles.

14. The seat of claim 5 wherein said latches each have an actuator and a cross-bolt, said actuator being moveable by an individual gripping said seat, said cross-bolt being moveable into and out of engagement with said holder by movement of said actuator to join said carrier to said holder and disjoin said carrier from said holder.

15. The seat of claim 14 wherein said motion of said cross-bolts requires movement of said actuators through a distance greater than a selected distance.

16. The seat of claim 5 wherein said actuator is linearly movable and wherein said cross bolt is movable in a direction transverse to said linear motion.

17. The seat of claim 14 wherein each said latch further comprises a spring resiliently opposing disengagement of said cross bolt from said holder.

18. The seat of claim 5 wherein said latches each further comprise an actuator, a spring, and a cross bolt, said actuator being linearly movable in directions toward and away from said cross bolt, said cross bolt being moveable into and out of engagement with said holder, said spring opposing said movement of said actuator away from said crossbolt, said actuator having a handle end and a cam end, said handle end being spaced from said cross bolt, said cam end and said cross bolt acting together as a cam and follower, respectively, to provide said movement of said cross bolt.

19. A latch for use with a car seat comprising a body, an actuator movable within said body, a spring, and a cross bolt, said actuator being linearly movable in directions toward and away from said crossbolt, said cross bolt being movable into and out of an engagement position, said spring opposing said movement of said actuator away from said cross bolt, said actuator having a handle end and a cam end, said handle end being spaced from said cross bolt, said cam end and said cross bolt together acting as a cam and follower to provide said movement of said cross bolt.

20. The latch of claim 19 wherein said actuator has a pair of opposed legs, each leg having an eccentric slot and wherein said crossbolt has a pair of opposed ears, said ears engaging said eccentric slots.

21. The seat of claim 5 wherein said carrier has a main portion and a pair of opposed side portions, said main portions separating said side portions from an occupant of said carrier, said side portions mating with said holder upon joining of said carrier and said holder.

22. The seat of claim 21 wherein said side portions each have a seat flange centered on a respective said latch, and wherein said holder has a pair of holder flanges complimentary in shape to said seat flanges.

23. A seat for use by a child in an automobile equipped with a seat belt, said seat comprising a base member securable within an automobile by said seat belt, said base member having a frame and a holder, said holder being disposed within said frame, an infant carrier removably joined to said holder, said carrier being joinable in a rigid relationship to said holder in both a forward placement and a reversed placement, said carrier being both joinable and disjoinable from said holder without removal of the child from said carrier, and means for restraining the child in said seat.

24. A seat comprising a frame, a holder mounted in said frame, said holder being movable between a plurality of positions within said frame, means for releasably retaining said holder in said positions, an infant carrier and one or more latches cnnected to said carrier, said insert having one or more seat flanges, said holder having one or more holder flanges, said holder flanges being complimentary in shape to said seat flanges, said seat flanges being slidable on said holder flanges to direct placement of said carrier on said holder, said latches being engageable when said seat flanges and said holder flanges are in mating relationship, said carrier being joinable in rigid relationship to said holder by said latches, said carrier being disjoinable from said holder by actuation of said latches.

25. The seat of claim 24 wherein said flanges are symmetrical such that said carrier is reversably joinable and disjoinable in both a forward position and a reverse position.

26. The seat of claim 24 wherein said flanges are asymmetrical said carrier being joinable and disjoinable only in a single orientation.

* * * * *